United States Patent [19]
Edwards

[11] Patent Number: 5,345,751
[45] Date of Patent: Sep. 13, 1994

[54] POLL AND EYE PROTECTION APPARATUS FOR A HORSE AND METHOD OF MANUFACTURE THEREOF

[76] Inventor: William L. Edwards, 7130 W. Acoma Dr., Peoria, Ariz. 85381

[21] Appl. No.: 77,668

[22] Filed: Jun. 18, 1993

[51] Int. Cl.⁵ .............................................. B68C 5/00
[52] U.S. Cl. ...................................................... 54/80.2
[58] Field of Search ........................ 54/10, 80.2, 80.5; 119/850

[56] References Cited

U.S. PATENT DOCUMENTS

| 481,152 | 8/1892 | Steele . | |
|---|---|---|---|
| 903,108 | 11/1908 | Rogers . | |
| 1,516,202 | 11/1924 | Nelson . | |
| 2,407,029 | 9/1946 | Miller | 54/80.2 |
| 3,753,334 | 8/1973 | Blessing | 54/80 |
| 3,778,966 | 12/1973 | Hadley | 54/81 |
| 4,662,156 | 5/1987 | Oettel | 54/80 |
| 4,756,145 | 7/1988 | Pelling | 54/80.2 X |

Primary Examiner—Robert P. Swiatek
Attorney, Agent, or Firm—Antonio R. Durando; Harry M. Weiss

[57] ABSTRACT

A horse mask or halter manufactured by folding a single piece of screen material according to a pattern that ensures the formation of rigid darts in the portion of the mask corresponding to the eyes of the horse. The mask incorporates poll-protection padding that minimizes the risk of injury to the head of the horse during transportation in a horse trailer. A separate opening in the mask is provided for each ear to create an anchoring support that prevents the mask from shifting position over the head of the horse. Sheep skin is used to pad the edges of the mask and prevent the intrusion of insects.

15 Claims, 3 Drawing Sheets

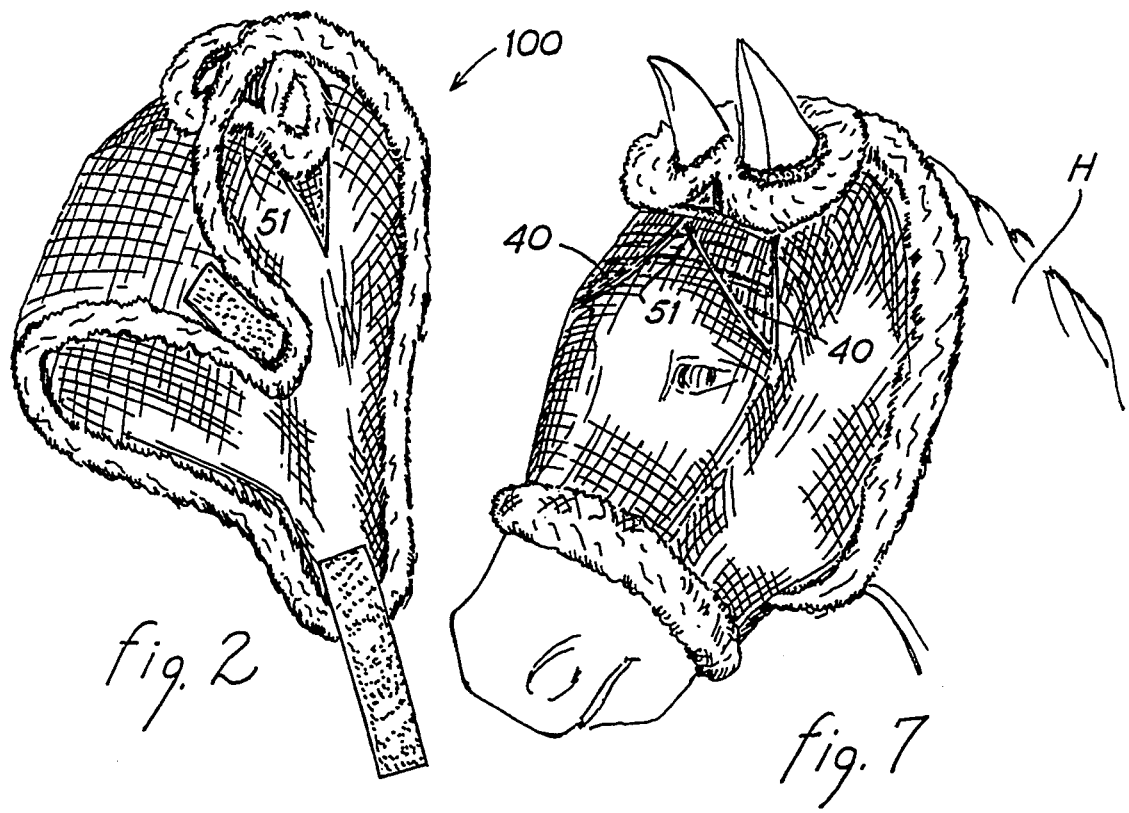
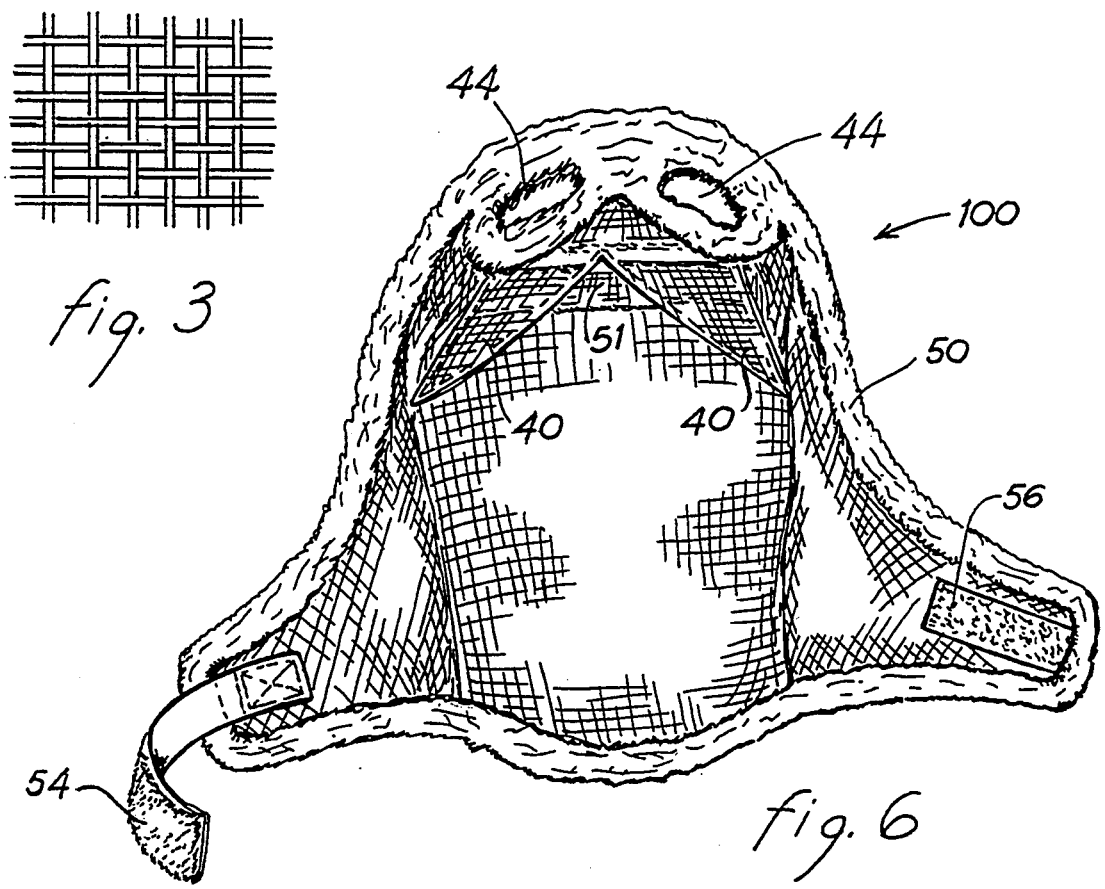

POLL AND EYE PROTECTION APPARATUS FOR A HORSE AND METHOD OF MANUFACTURE THEREOF

BACKGROUND OF THE INVENTION

1. Field of the Invention

This invention is related in general to the field of protective masks for animals and, in particular, to devices for shielding a horse's poll and eyes.

2. Description of the Related Art

It is well known that horses' eyes are very sensitive to the effects of light and to molestation by insects, such as flies. In order to rid themselves of flies crawling over them, horses often shake their heads violently and strike surrounding objects in frustration, thus endangering their own safety and that of bystanders. Accordingly, over the years people have devised different items of protective wear to shield a horse's eyes from insects and from direct sunlight.

For example, U.S. Pat. No. 481,152 to Steele (1892) discloses a device that comprises two perforated shades used to cover the eyes of a horse in order to protect them from foreign matter.

The eye protector also includes strips of flexible material hanging down from the device to cover the horse's nostrils and muzzle, thus providing further protection against insects. The eye protector is secured to the bridle normally worn by the horse.

U.S. Pat. No. 903,108 to Rogers (1908) describes a similar type of eye protector consisting of individual eye coverings connected to a system of straps that permit its direct attachment to the head of the horse. Thus, this device can be worn even when the horse does not have a bridle or halter on its head.

In U.S. Pat. No. 1,516,202 (1924), Nelson discloses a fly shield for a horse consisting of a muzzle made with screen material. The device is designed to cover the mouth and the lower portion of the head of a horse primarily to prevent insects from contacting its nose, which is particularly sensitive to flies. No protection is provided for the eyes of the animal.

U.S. Pat. No. 3,753,334 to Blessing (1973) describes a bonnet that protects the upper portion of a horse's head, including the eyes, from exposure to insects and excessive sunlight. The bonnet is made with screen material that envelopes the entire head of the animal and is fastened by straps secured to the head independently of a bridle.

In U.S. Pat. No. 3,778,966 (1973), Hadley describes a face fly-screen consisting of a fringe secured to the poll of the horse and covering the entire front portion of the head. Thus, the eyes are protected by the screen effect of the individual strips constituting the fringe, which also prevent insects from resting on the animal's face.

Finally, U.S. Pat. No. 4,662,156 to Oettel (1987) discloses a protective mask for horses that consists of a one-piece screen for covering the eyes and the adjacent facial areas of the animal. Contact between the screen material and the eyes is prevented by straight darts sewn into the material that create two pockets protruding slightly forward from the poll of the animal. The edges of the mask are trimmed in a plush material to prevent insects from crawling under the mask and to provide a padding for protecting the animal's face from immediate contact with the relatively rigid material constituting the screen. The mask includes a single cut-out area for the animal's ears and forelock.

The Oettel mask is intended to be worn at all times by a horse to provide continuous protection from insects and excessive light exposure. As such, the mask has shown several drawbacks that the present invention is addressing. The first one relates to the presence of a single opening over the poll of the horse. In order to accommodate both the ears and the forelock of the horse, this opening is approximately 24 inches in circumference, which greatly weakens the structural rigidity of the mask and its ability to retain the intended position over the head of a horse. As a result, the mask tends to shift around the face of the animal, which undermines its effectiveness against insects and may create discomfort. In addition, the large opening provides a relatively loose fit around the ears that enables insects to penetrate through the sealing material at the edge of the opening.

A second problem results from the single-seam construction of the darts, which results in a relatively soft structure that in some cases allows the screen material to droop and rest over the eyes of the horse, especially when the mask is not squarely balanced over the head of the animal as a result of the above-mentioned shifts. Finally, the mask does not provide any protection to the poll of the horse, which is a very sensitive part of the animal that needs protection both from exposure to climatic extremes and from the surrounding environment. In particular, the poll of a horse needs to be protected during transportation in horse trailers because the animals tend to rub their heads against the top of the trailer, often to the point of severely injuring themselves. Since these masks are intended for continuous use, the utilization of separate protective wear on top of the mask would be cumbersome and uncomfortable to the animal.

Therefore, there is still a need for an improved horse mask that incorporates poll-protection means and overcomes the problems that result from the above-described structural features of the Oettel mask.

SUMMARY OF THE INVENTION

One objective of this invention is a horse mask that incorporates poll-protection means to prevent self-inflicted injury to the head of the horse during transportation in a horse trailer.

Another goal of the invention is a mask that contains multi-layered darts that ensure a separation of the screen material constituting the mask from the eyes of the animal irrespective of shifts in the position of the mask on the head of the animal.

Yet another goal of the invention is a mask that contains separate ear apertures that minimize the opportunity for mask deformation and shift during use.

Still another objective is a method of construction that permits the manufacture of a mask with the above-described features from a single piece of screen material.

A final objective is the economical manufacture of the mask according to the above-stated criteria. This is achieved by using commercially available components and materials, modified only to the extent necessary to fit the requirements of the invention.

Therefore, according to these and other objectives, the present invention consists of a horse mask or halter manufactured by folding a single piece of screen material according to a pattern that ensures the formation of rigid darts in the portion of the mask corresponding to the eyes of the horse. The mask incorporates poll-protection means that minimize the risk of injury to the head of the horse during transportation in a horse trailer. A separate opening in the mask is provided for each ear to create an anchoring support that prevents the mask from shifting position over the head of the horse. Sheep skin is used to pad the edges of the mask and prevent the intrusion of insects.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

FIG. 2 is a perspective bottom and side view of a protective mask resulting from the pattern illustrated in FIG. 1.

FIG. 3 is an enlarged view of the mesh configuration of the see-through, protective screen material used in manufacturing the mask of this invention.

FIG. 6 is a perspective front view of a protective mask resulting from the pattern illustrated in FIG. 1.

FIG. 7 is a perspective view of the mask of FIG. 6 being worn by a horse.

DESCRIPTION OF THE PREFERRED EMBODIMENT

The most important inventive features of the apparatus of this invention relate to protective means incorporated into a unique pattern for manufacturing an improved horse mask or halter that overcomes the shortcomings of the equipment currently used to protect horses from dust, excessive sunlight exposure and insect molestation. The pattern of this invention makes it possible to manufacture the improved mask from a single piece of screen material.

Figure 1:
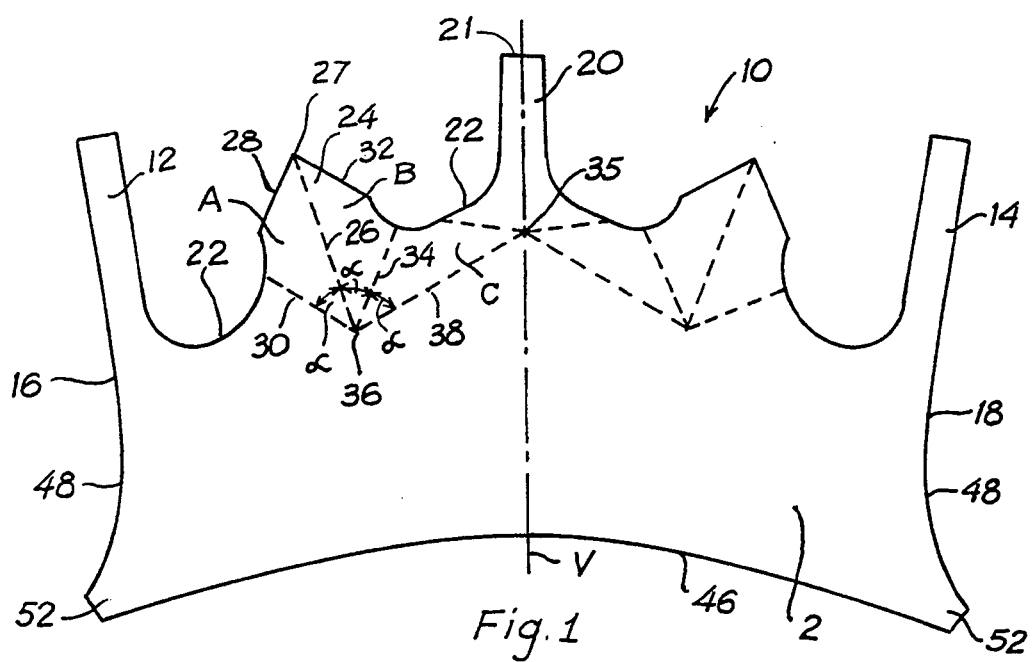
FIG. 1 is a plan view of the screen-material pattern used to manufacture the preferred embodiment of the present invention.

Referring to the drawings, wherein like parts are designated throughout with like numerals and symbols, FIG. 1 illustrates in plan view the pattern 2 used to cut the screen material 10 to manufacture the preferred embodiment of the invention in the form of a horse mask or halter 100, which is illustrated in perspective view in FIG. 2. The screen material used can be any mesh fiber, such as shown in FIG. 3, capable of providing protection from sunlight, dust and insects while permitting visibility through the mask. The material preferably consists of a synthetic fiber, such as the vinyl-coated polyester yarn sold by Twitchell Industries of Dothan, Alabama, under the Part No. T91-DL, which is washable and provides durability in spite of prolonged exposure to outdoors conditions. Most importantly, and critical for the design of this invention, the material must be sufficiently rigid to create stiff segments of mask when the material is folded and stitched in overlapping fashion to form protective darts. These segments must be capable, under either dry or wet conditions, to retain their shape to provide the necessary stiffness and support to avoid the deformation of the mask while it is being worn by a horse. This will ensure that the darts effectively protect the eyes of the horse from contact with the mask and that the mask is not deformed by its own weight to create open spaces that permit dust or insect intrusion through the openings around the ears.

These desirable features in a horse mask may be achieved by manufacturing the mask from a single piece of screen material cut substantially according to the pattern 2 illustrated in FIG. 1. Critical to this pattern is the presence of a left ear strap 12 and a right ear strap 14 protruding upwardly from the left and right side edges 16 and 18, respectively, of the material and of a poll strap 20 protruding upwardly from the center thereof. Inasmuch as the shape of the material 10 is symmetrical with respect to the vertical axis V, only one side will be described in detail herein, it being understood that the other side is the mirror image thereof.

Figures 4, 9:
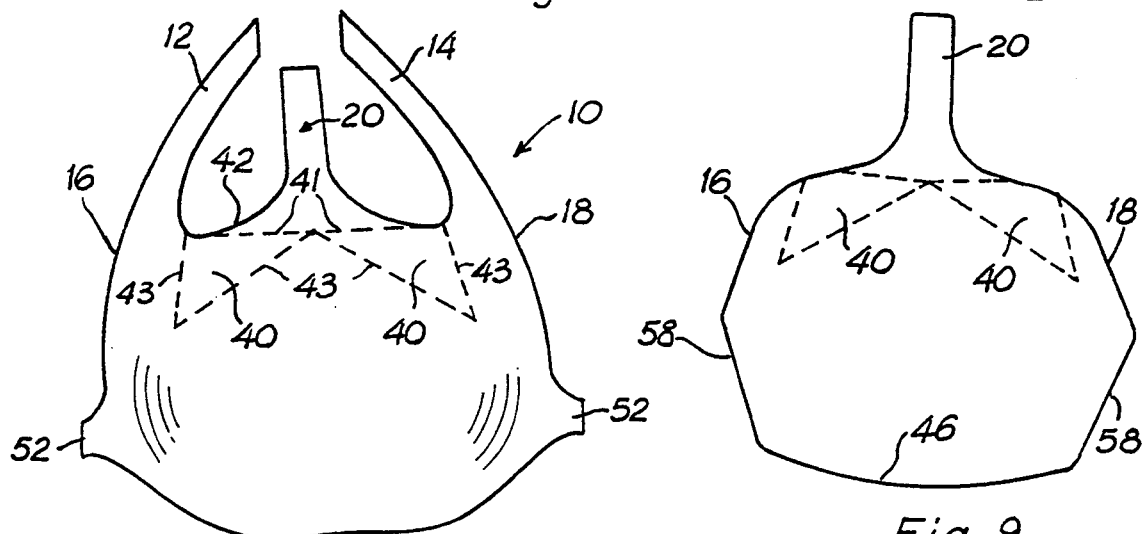
FIG. 4 is a plan view of the screen material of the invention after folding and stitching of the dart portions.
FIG. 9 is a plan view of the screen material of the invention according to FIG. 8 after folding and stitching of the dart portions.

Approximately half way between the poll strap and each ear strap along the top edge 22 of the material 10 is a dart protrusion 24 that defines a substantially rhombic section of material that is itself symmetrical with respect to its imaginary major axis 26 that joins top and bottom vertices 27 and 36, respectively. The edge 28 and the imaginary rhombus side 30 are equal to their symmetrical counterparts 32 and 34, respectively, and each forms an angle e with the axis 26. In addition, the position of the dart protrusion 24 is chosen such that the lower vertex 36 of the rhombic FIGURE is disposed at a predetermined distance from a point 35 coinciding approximately with the bottom end of the poll strap 20. Measured along the line 38 that forms an angle α with the imaginary side 34, the distance between the vertex 36 and the point 35 is equal to the length of the imaginary axis 26. The result is that three substantially triangular equal portions of material are identified, labeled A, B and C in the drawings, which share the common vertex 36 and therefore can be folded in overlapping fashion to form a triangular multilayered, stiff dart structure 40 in the mask. This is accomplished by folding the material 10 along the imaginary side 34 to cause the axis 26 to overlap the imaginary line 38, so that the top vertex 27 coincides with the point 35 at the bottom of the poll strap. Then the material is folded in the opposite direction along the axis 26 to bring the imaginary rhombus side 30 to overlap the edge formed by the first fold along the side 34. When both sides of the material 10 are so folded and the portions A, B and C are fastened together by stitching or equivalent means, the material necessarily acquires a curved configuration (seen as concave from one side and convex from the other) that brings the two ear straps 12 and 14 toward the poll strap 20, as illustrated in the plan view of FIG. 4. Each dart 40, which consists of overlapped portions A, B and C stitched or otherwise fastened together, provides a stiff three-layer structure that prevents the mask from sagging over the face of the horse and making contact with the horse's eye lids. In addition, the ear straps are directed toward the poll strap by the curved shape acquired by the screen material 10. As shown in the partial view of FIG. 5, each ear strap is then overlapped with and fastened to the poll strap 20 where the straps intersect near the top end 21 of the poll strap, so that, in combination with the edge 42 resulting from the overlap of portions A, B and C, an ear opening 44 is formed on each side of the poll strap. Correspondingly, the two side edges 16 and 18 become joined to form a continuous outer edge 45.

Note that the important feature of this invention in relation to the formation of the darts 40 is that the dart protrusions 24 in the top edge 22 of the pattern be shaped in such a way that three equal, adjacent and substantially triangular sections with a common vertex may be identified in each half of the pattern for folding in overlapping configuration, so that a multilayered dart may be formed on each side of the mask. The specific position of the triangular sections depends on the desired shape and location of the darts in the masks. Thus, some of the specifications listed above, such as the location of point 35 along the vertical axis V, are desirable but not essential to practice the invention. I found that a triangular shape of sections A, B and C that results in the lower vertex 36 resting over the cheek-bone bump of the horse is best suited to achieve the goals of the invention. This geometry will facilitate the retention of the mask's shape during use, improving its ability to screen out insects and dirt and minimizing interference with the horse's eyes. Each dart 40 has a top edge 41 adapted to be placed to rest above one eye of the horse and two lateral edges 43 extending forward over the eye, thus producing a mask of screen material adapted to be disposed over the horse's eyes without interference.

When the material 10 is sized according to the proportions illustrated in the drawings and described herein, the resulting structure is found to conform well to the shape of the head of a horse, thus providing a very useful pattern for making a mask having the described protective features. For a horse of average size, it is found that the screen material should preferably have curved side edges 16 and 18 about 18 inches long and a curved bottom edge 46 approximately 35 inches long. The degree of curvature of each edge is chosen to provide optimal fit around the head of the horse when the mask is worn. Each ear strap and the poll strap are 3–4 inches wide and about 8 and 6 inches long, respectively. Finally, the pattern 2 for the material is approximately 29 inches wide at its narrowest point 48 and about 18 inches high (including the length of the poll strap 20) along the vertical axis V. An angle $\alpha$ of 35 to 40 degrees results in portions A, B and C that produce appropriately sized darts 40.

The process of manufacture of the protective mask of this invention further requires covering every edge of the screen material 10 with padding material 50 capable of protecting the horse's skin from potential irritation caused by rubbing against the mask. This padding material is also necessary to provide intimate contact between the mask and the skin in order to prevent intrusion by insects and dirt. Sheepskin, either natural or artificial (such as the product sold by West Point Pepperell of Valley, Alabama, as "Very Heavy Fleece" under the trademark "Textra"), in a layer 1 to 1.5 inches thick, has been found to provide optimum protection for both purposes. It is sufficiently thick to prevent intrusion by flies and other insects and sufficiently soft to provide comfort even during prolonged wear. The same padding material 50 is attached to the edge of each ear opening 44 to protect the ears and similarly prevent insect intrusion. I found that the addition of a strip 51 of sheepskin material 50 along the top edges 41 of the darts 40 between the ear openings 44 inside the mask further enhances the separating function of the darts and prevents them from interfering with the horse's forelock, thus providing protection and additional comfort to the animal. Finally, means are provided for fastening the bottom ends 52 (at the convergence of the side edges 16 and 18 with the bottom edge 46) of the material to each other in order to form a loop for wrapping the mask around the head of the horse. Preferably, a strap 54 containing fiber loop and hook material ("Velcro") and a corresponding anchoring pad 56 are used to provide adjustable means for tying the bottom ends 52. The resulting mask is illustrated in FIGS. 2 and 6, wherein the mask is seen from the rear and the front, respectively.

As shown in FIG. 6, the stiffness of the darts 40 creates a forward protrusion that prevents the mask from sagging and drooping over a horse's eyes. Moreover, the structure resulting from overlapping the two ear straps over the poll strap, in conjunction with the padding material 50 attached along the outer edge 45, provides a protective layer for the poll of the horse. This protection is particularly important during transportation of the animal in an enclosed horse trailer because horses typically rub their head against the upper frame of the trailer and often injure themselves. FIG. 7 illustrates the mask of the invention being worn by a horse H.

Figures 5, 8:
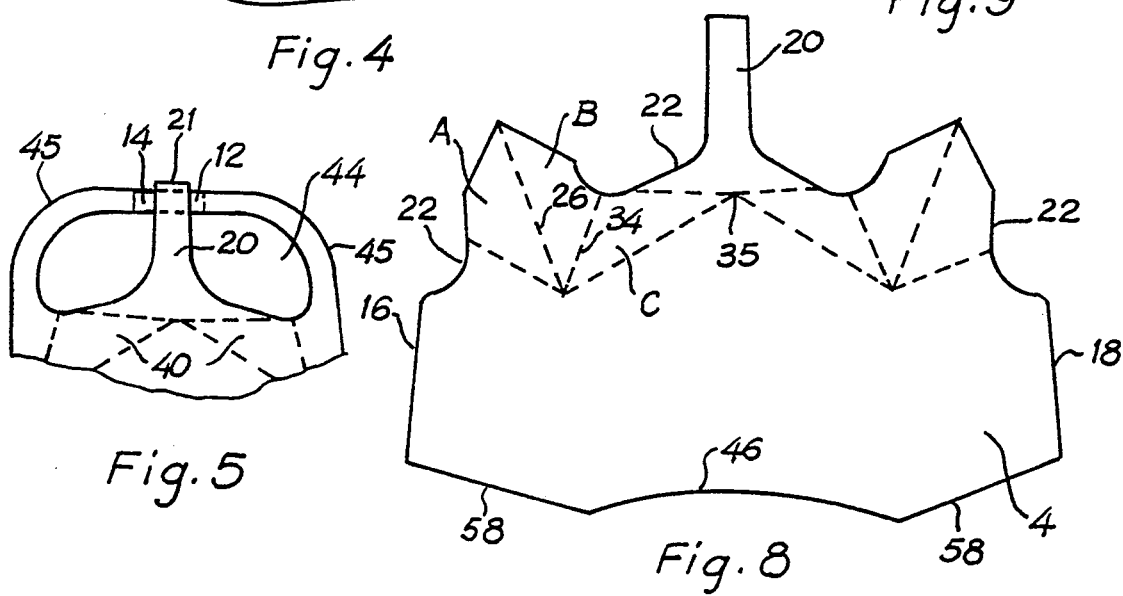
FIG. 5 is a partial view of the screen material of FIG. 4 after each ear strap is overlapped with and fastened to the poll strap.
FIG. 8 is a plan view of the screen-material pattern used to manufacture an alternative embodiment of the present invention for use in combination with bridle gear.

The same method of construction can be used to manufacture an embodiment of the invention designed for use with standard bridle gear. As seen in FIG. 8, the pattern 4 for this embodiment is essentially the same as the pattern 2 shown in FIG. 1, except for the ear straps 12 and 14 and the bottom ends 52, which are missing. The poll strap 20 is retained and two lateral edges 58 replace the bottom ends 52 to provide a means for fastening the mask to the bridle of a horse. By folding and stitching the portions A, B and C along the lines 26 and 34, as outlined above, the pattern 4 also necessarily acquires a concave shape that, when wrapped around the face of a horse, brings the two lateral edges 58 in a position parallel to the side straps 110 of a conventional bridle (see FIG. 11). Again, each dart 40, which consists of overlapped portions A, B and C stitched or otherwise fastened together, provides a stiff structure that prevents the mask from sagging over the face of the horse and making contact with the horse's eye lids.

Figure 11:
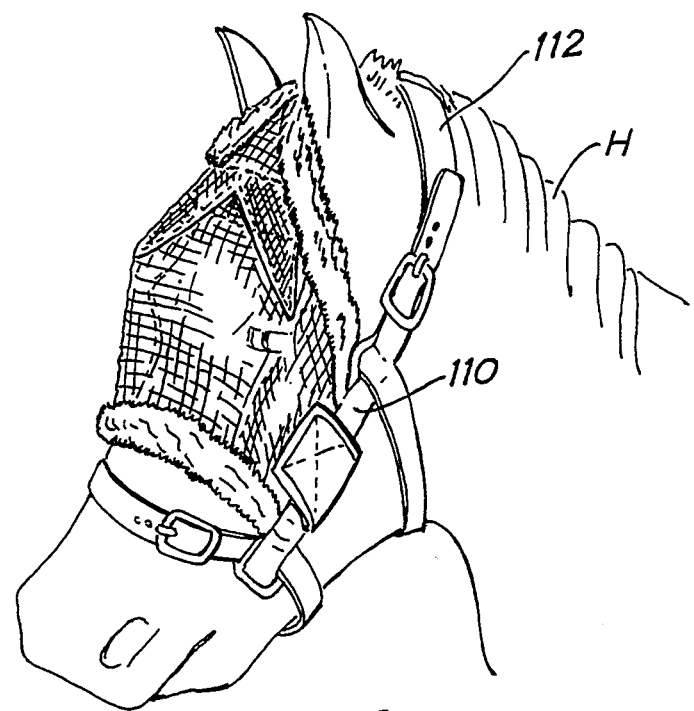
FIG. 11 is a perspective view of the mask of FIG. 10 being worn by a horse equipped with bridle gear.
Figure 10:
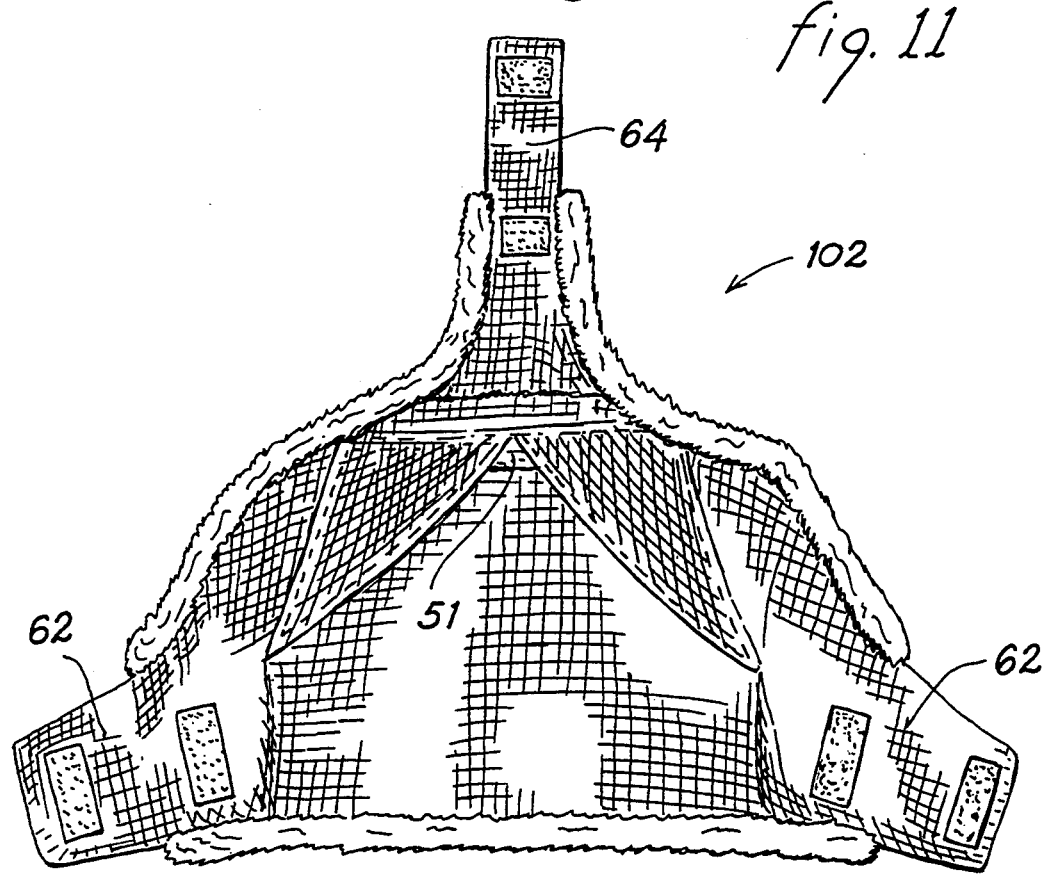
FIG. 10 is a perspective front view of a protective mask resulting from the pattern illustrated in FIG. 8.

As in the case of the first embodiment, the process of manufacture of the protective mask requires covering every edge of the screen material with padding material 50 capable of protecting the horse's skin from irritation caused by rubbing, dust or insects. Similarly, a strip 51 of padding material 50 is attached along the top edge of the darts 40 inside the mask, as shown in FIG. 10, to protect the forelock from the stiff dart structure. Finally, means are provided for securing the poll strap 20 of the mask to the top strap 112 of a bridle (see FIG. 11) and each lateral edge 58 to the side strap 110 of the bridle. Preferably, these means also consist of straps 62 and 64 attached to the lateral edges 58 and the poll strap 20, respectively, and containing "Velcro" fasteners, so that each strap can be folded around the corresponding bridle strap and fastened to secure the protective mask in place. FIG. 11 illustrates a horse H wearing bridle gear and a mask 102, manufactured according to this embodiment of the invention, secured to it.

Other than specifically described, the invention can obviously take other shapes with equivalent functionality and utility. For example, different-size masks are required to fit different-size animals and the disclosed patters would be adjusted accordingly. In fact, any shape for any of the components that are not specifically described is acceptable to practice the invention so long as it retains the functional characteristics described above.

Thus, various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. A method for manufacturing a mask for protecting the eyes and the poll of a horse, comprising the following steps:
   (a) cutting screen material according to a horizontally symmetrical pattern that defines two equal sides with respect to a vertical axis; said pattern comprising a bottom edge, two side edges, and a top edge divided into two equal segments by a poll strap protruding upwardly from a center thereof; wherein each segment of the top edge contains a dart protrusion defining three equal and substantially triangular sections having a common vertex and capable of being folded in overlapping configuration to form a three-layered dart in each half of the pattern;
   (b) folding the screen material to cause said three equal and substantially triangular sections to overlap;
   (c) fastening the three triangular sections folded in overlapping configuration to produce a three-layered dart in each half of the pattern, wherein each dart has a top edge adapted to be placed to rest above one eye of the horse and two lateral edges extending forward over the eye, thus producing a mask of screen material adapted to be disposed over the horse's poll and eyes;
   (d) attaching padding material to said bottom edge, said two side edges, said folded top edge, and said poll strap in the screen material produced by steps (a) and (b); and
   (e) providing fastening means to secure the mask on the horse, wherein the mask is positioned with the darts disposed above the horse's eyes and the poll strap is disposed over the horse's poll.

2. The method described in claim 1, further comprising the step of attaching padding material along the top edge of the darts inside the mask.

3. The method described in claim 1, wherein said fastening means to secure the mask on the horse consists of fiber-hook-and-loop straps attached to the poll strap and to each side edge of the mask.

4. The method described in claim 1, wherein said padding material is sheepskin.

5. The method described in claim 1, wherein said fastening means to secure the mask on the horse consists of fiber-hook-and-loop straps attached to the poll strap and to each side edge of the mask; wherein said padding material is sheepskin; and further comprising the step of attaching a strip of sheepskin along the top edge of the darts inside the mask.

6. The method described in claim 1, wherein each of said two side edges described in step (a) has an ear strap protruding upwardly therefrom and a bottom end connecting each side edge to the bottom edge; wherein step (c) further comprises the step of overlapping both ear straps with the poll strap and fastening them thereto, thereby creating two ear openings; and wherein step (d) further comprises the step of attaching padding material to said two ear openings.

7. The method described in claim 6, further comprising the step of attaching padding material along the top edge of the darts inside the mask.

8. The method described in claim 6, wherein said fastening means to secure the mask on the horse consists of fiber-hook-and-loop straps attached to each bottom end of the mask.

9. The method described in claim 6, wherein said padding material is sheepskin.

10. The method described in claim 6, wherein said fastening means to secure the mask on the horse consists of fiber-hook-and-loop straps attached to each bottom end of the mask; wherein said padding material is sheepskin; and further comprising the step of attaching a strip of sheepskin along the top edge of the darts inside the mask.

11. A horse mask manufactured according to the method described in claim 6.

12. The method described in claim 1, wherein the side edges are curved and about 18 inches long, the bottom edge is curved and approximately 35 inches long, and the degree of curvature of each edge is chosen to provide optimal fit around the head of the horse when the mask is worn.

13. The method described in claim 12, wherein each ear strap and the poll strap are 3–4 inches wide and about 8 and 6 inches long, respectively.

14. The method described in claim 13, wherein the pattern for the screen material is approximately 29 inches wide at a narrowest point and, when measured along a line including the poll strap, is about 18 inches high.

15. A horse mask manufactured according to the method described in claim 1.

* * * * *